United States Patent
Janay

(10) Patent No.: US 7,337,387 B1
(45) Date of Patent: Feb. 26, 2008

(54) INTERCEPTING DOCUMENT DATA FROM A SPOOLER AND USING THE DATA TO RETRIEVE RELATED INFORMATION FROM A DATA BASE TO MODIFY THE DOCUMENT

(75) Inventor: Gad Janay, Boca Raton, FL (US)

(73) Assignee: Tradepaq Corporation, New York, NY (US)

( * ) Notice: Subject to any disclaimer, the term of this patent is extended or adjusted under 35 U.S.C. 154(b) by 0 days.

(21) Appl. No.: 09/197,844

(22) Filed: Nov. 23, 1998

(51) Int. Cl.
G06F 15/00 (2006.01)

(52) U.S. Cl. .............. 715/500; 715/526; 358/1.15; 358/1.16; 707/1

(58) Field of Classification Search ............ 707/500, 707/525, 501.1, 1, 3; 358/1.1, 1.15–1.16, 358/3.24, 1.18; 715/500, 525–527, 501.1
See application file for complete search history.

(56) References Cited

U.S. PATENT DOCUMENTS 5,295,181 A * 3/1994 Kuo .................. 379/100.07
5,316,279 A * 5/1994 Corona et al. ............. 270/1.01
5,388,194 A * 2/1995 Vogel ....................... 358/1.18
5,528,734 A * 6/1996 Sanchez ................... 358/1.16
5,532,920 A * 7/1996 Hartrick et al. ............... 380/55
5,547,178 A * 8/1996 Costello .................. 270/52.02
5,591,553 A * 1/1997 Snelling ..................... 430/42
5,842,023 A * 11/1998 Tsumura ................... 709/246
5,890,173 A * 3/1999 Yoda ......................... 358/1.15
5,980,676 A * 11/1999 Meetze ..................... 156/216
5,987,127 A * 11/1999 Ikenoue et al. ........... 358/401
6,014,228 A * 1/2000 Castro ...................... 358/400
6,052,730 A * 4/2000 Felciano et al. .......... 709/203
6,118,546 A * 9/2000 Sanchez et al. ............ 358/1.6
6,209,030 B1 * 3/2001 Ohashi ..................... 707/501.1
6,313,921 B1 * 11/2001 Kadowaki ................. 358/1.15
6,327,599 B1 * 12/2001 Warmus et al. ........... 707/517
6,327,600 B1 * 12/2001 Satoh et al. ............... 128/849
6,332,149 B1 * 12/2001 Warmus et al. ............. 707/15
6,466,328 B1 * 10/2002 Bradley et al. ........... 358/1.15

OTHER PUBLICATIONS

Barnes, K., "10 Minute Guide To Windows 3.1", SAMS, 1992, p. 119-123.*
Configurable Document Composition Formatter, IBM TDB, Nov. 1991, vol.No. 34, Iss. No. 6, pp. 185-186.*

* cited by examiner

Primary Examiner—Cesar B Paula
(74) Attorney, Agent, or Firm—Kaplan Gilman Gibson & Dernier LLP

(57) ABSTRACT

An improved document generation tool which intercepts data from a print spool and utilizes that data in conjunction with the database to cause certain changes to the final printed data.

18 Claims, 1 Drawing Sheet

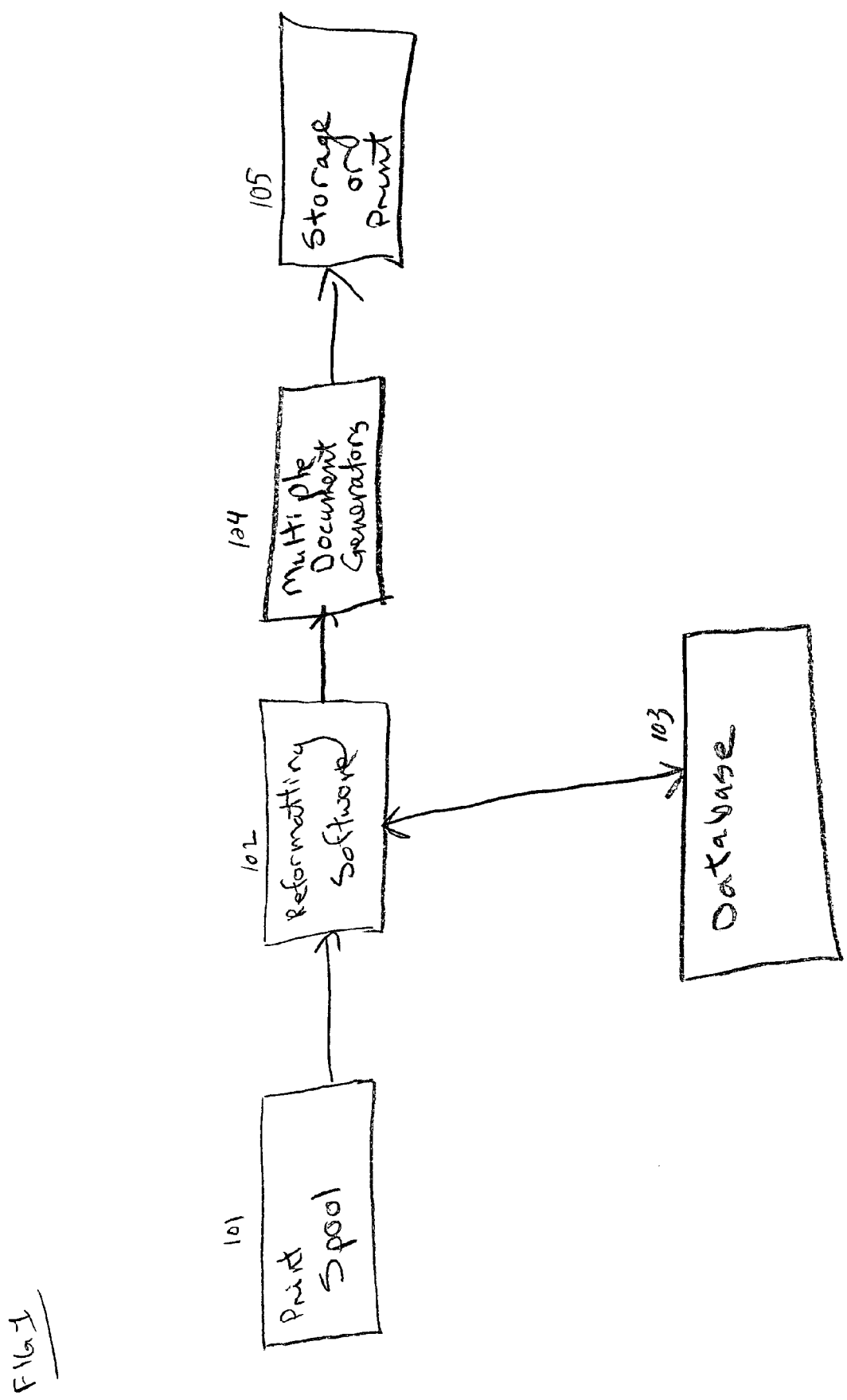

INTERCEPTING DOCUMENT DATA FROM A SPOOLER AND USING THE DATA TO RETRIEVE RELATED INFORMATION FROM A DATA BASE TO MODIFY THE DOCUMENT

TECHNICAL FIELD

This invention relates to the generation of business documents for a variety of transaction, and more particularly, to an improved technique of creating documents for such transactions.

BACKGROUND OF THE INVENTION

The generation of standard business documents has long created problems and errors. Specifically, incorrect codes, incomplete information, and other typographical errors often leads to much delay, incorrect actions being taken, etc. Although many such documents are generated by computer, a simple keystroke error can lead to plural documents being incorrectly generated.

It is desirable to allow business documents typically generated from a computer program to be generated and modified to any format as a particular user desires. This modified format could include additional information not normally included in such business documents.

Any solution implementing the above should ideally be in the form of a straightforward software package which can be implemented by almost any user. Solutions shall also include an error checking ability.

SUMMARY OF THE INVENTION

The above and other problems of the prior art are overcome in accordance with the invention which relates to a software program which intercepts data spooled to a printer. The data may then be utilized as an index key to a separate database, the separate database containing additional and/or different information from that contained in the document to be printed. The final document printed may then be in any format desired. Additionally, the index key can be utilized to verify information in the document and check it against a database for errors.

BRIEF DESCRIPTION OF THE DRAWINGS

FIG. 1 shows a high-level block diagram of the functionality of what should be implemented in accordance with an exemplary embodiment of the present invention.

DETAILED DESCRIPTION OF THE PREFERRED EMBODIMENT

FIG. 1 shows a functional block diagram of several steps to be implemented in accordance with the teachings of the present invention. The arrangement of FIG. 1 includes a print spool block 101 which represents arriving data to be printed, the reformatting software 102 done in accordance with the teachings of the present invention, an exemplary database 103, multiple document generators 104 for interpreting and formatting and generating the numerous documents resulting from the reformatting software interacting with database 103 and the principal data received from 101, and a storage or print block 105.

In operation, the data to be printed from the software application arrives via print spool 101 and is intended to be sent to the printer. From the point of view of such applications software, the print spool is feeding its data directly to a printer, and blocks 102 through 104 are non-existent.

In accordance with the present invention, the reformatting software 102 is arranged to parse certain information fields of the data being spooled to the printer from print spool 101. The parsed information may then be utilized as a key to database 103 for adding additional information. For example, the parsed information may include the vendor name to be printed, and the database could provide that vendor's shipment terms. As another example, the parsed field could include the name of an entity, and the database can include its payment record. Other possibilities may be implemented as well.

Another possibility is to generate multiple copies of the documents, each with different information in certain fields. For example, there may be five or six copies of the document generated for different entities, each of which require certain other information, not required by other parties receiving the documents. The document type could be parsed by the reformatting software which keys that document type to the database 103. That database is then utilized with the reformatting software in order to determine which copies of the generated documents should include which information. The reformatting software can then send the multiple documents through the multiple document generator so that the printing or storage function 105 receives several different documents which, although being similar, each contains slightly different information.

The foregoing feature is useful, for example, in order to take a printed document and generate confidential and non-confidential versions thereof. Specifically, the reformatting software could utilize database 103 in order to determine which information should be deleted from the non-confidential version and then generate two versions of the document, one with the confidential information and one without. Other than such confidential information, the same information would be printed on both sets of documents.

Additionally, the printed documents may be double-sided. Specifically, the reformatting software can be utilized to allow for double-sided printing by reformatting the data from the print spool and causing prompts to be generated indicating that the user should load paper in a manner such that the print can be double-sided.

In addition to the foregoing, new messages may be added or created, abbreviations may be used to determine, from database 103, the full name of something and to print out final documents with the full name.

The above is representative of examples only, and it is understood that various modifications can be made without departing from the scope of the invention.

The invention claimed is:

1. A document formatting tool for a document stored in the form of data in a print spool, the data being held for delivery to a printer connected to an output of the print spool, comprising:
   a connection to the output of the print spool;
   means monitoring the connection for intercepting said data as it is being sent to the printer from the print spool for printing by said printer;
   means for utilizing a specified portion of such intercepted data as an index key to access a database for obtaining other information relevant to such data; and
   means responsive to said other information for modifying the intercepted data so that when the modified data is presented to the printer, the printed document is in a different format from said document stored in the print spool, such difference being based upon said other information received from the database.

2. The tool according to claim 1 wherein said other information includes instructions for generating multiple copies of said document even when only one copy of said document was received from the print spool.

3. The tool according to claim 1 further comprises multiple document generators for generating multiple documents which all comprise said data and differ from each other by the other information derived from said database.

4. The tool according to claim 3 wherein said certain information is based upon whether or not information is confidential.

5. A document formatting tool for a document stored in the form of data in a print spool, the data being held for delivery to a printer connected to an output of the print spool, comprising:

a connection to the output of the print spool;

means monitoring the connection for intercepting said data it is being sent to the printer from the print spool for printing by said printer;

means for utilizing a specified portion of such intercepted data as an index to a database for determining other information relevant to such data; and means responsive to said other information and said intercepted data for generating a new document for presentation to the printer and having a new format different from the format of the stored document based upon said other information from the database.

6. The document formatting tool of claim 5, wherein said difference in format is that said new document comprises multiple copies of said original document.

7. The document formatting tool of claim 5, wherein said difference in format is that said document is designated for double-side printing by said printer.

8. The document formatting tool of claim 5 wherein said new document further comprises additional content acquired from said other information.

9. The document formatting tool of claim 5 further comprising multiple document generators for generating multiple documents each comprising said data and an additional content acquired from said other information, wherein said additional content in each of multiple documents is different from each other.

10. A document generating tool for a document stored in the form of data in a print spool, the data being held for delivery to a printer connected to an output of the print spool, comprising:

a connection to the output of the print spool;

means monitoring the connection for intercepting said data as it is being sent to the printer from the print spool for printing by said printer;

means for utilizing a specified portion of such intercepted data as an index key to a database for determining additional information relevant to such data; and means responsive to said other information and said intercepted data for generating multiple documents each comprising said stored document as well as additional data from said additional information, wherein said additional data is different in each of said multiple documents.

11. A document generating tool for a document stored in the form of data in a print spool, the data being held for delivery to a printer connected to an output of the print spool, comprising:

a connection to the output of the print spool;

means monitoring the connection for intercepting said original data in said document as it is being sent to the printer from the print spool for printing by said printer, said intercepted data comprising a first portion and a second portion;

means for utilizing a specified one of said portions of such intercepted data as an index key to a database for obtaining other information relevant to such data; and means responsive to said other information and said intercepted data for generating at least two documents based on said other information, one comprising both portions of said intercepted data, while the other only comprises said first portion of said intercepted data.

12. The document generating tool of claim 11, wherein said second portion is a confidential portion of said original data.

13. The document generating tool of claim 11, wherein at least one of said generated documents further comprises additional content acquired from said database.

14. The document generating tool of claim 11, wherein each said generated document has different additional content from each other acquired from said database.

15. A method for formatting a business document, to be stored in the form of data in a print spool, the data being held for delivery to a printer connected to an output of the print spool, comprising the steps of:

(a) receiving from a source at the print spool information that comprises an identification segment and a content segment;

(b) intercepting the information at an output of the print spool before it reaches the printer;

(c) parsing the identification segment;

(d) utilizing the identification segment as an index key for accessing a database;

(e) acquiring from the database data having first and second defined portions that are related to the identification segment;

(f) using the printer, printing the content and a first defined portion of the data in a first document; and (g) using the printer, printing the content and a second defined portion of the data in a second document.

16. The method of claim 15, wherein the data acquired from the database comprises instructions for formatting the first and second documents.

17. The method of claim 16, wherein the step of printing comprises printing a plurality of copies of the documents.

18. The method of claim 17, wherein the step of printing a plurality of copies comprises printing a first selected number of copies with a first defined portion of the information and a second selected number of copies with a second defined portion of the information.

* * * * *